(12) United States Patent
Lacapere et al.

(10) Patent No.: US 8,690,000 B2
(45) Date of Patent: Apr. 8, 2014

(54) CRYOGENIC TANK AND SPACE LAUNCHER INCLUDING SUCH A TANK

(75) Inventors: Jerome Lacapere, St. Etienne de Crossey (FR); James Butterworth, Fontaine (FR)

(73) Assignee: L'Air Liquide, Société Anonyme pour l'Étude et l'Éxploitation des Procédés Georges Claude, Paris (FR)

( * ) Notice: Subject to any disclaimer, the term of this patent is extended or adjusted under 35 U.S.C. 154(b) by 212 days.

(21) Appl. No.: 13/148,101

(22) PCT Filed: Jan. 28, 2010

(86) PCT No.: PCT/FR2010/050130
§ 371 (c)(1),
(2), (4) Date: Aug. 5, 2011

(87) PCT Pub. No.: WO2010/089493
PCT Pub. Date: Aug. 12, 2010

(65) Prior Publication Data
US 2011/0289942 A1  Dec. 1, 2011

(30) Foreign Application Priority Data
Feb. 5, 2009  (FR) ...................................... 09 50697

(51) Int. Cl.
*B65D 88/78* (2006.01)
*B64G 1/40* (2006.01)
*F02K 9/76* (2006.01)
*B65D 88/12* (2006.01)

(52) U.S. Cl.
CPC ......... *B64G 1/402* (2013.01); *F17C 2223/0161* (2013.01); *F02K 9/766* (2013.01); *B65D 88/12* (2013.01)
USPC ................. 220/560.04; 220/560.07; 137/574; 137/590; 60/257

(58) Field of Classification Search
CPC .. B64G 1/202; F17C 2223/0161; B65D 88/12
USPC ........ 137/574, 590; 244/135 R, 172.2–172.3; 60/257; 96/187, 219, 330; 220/560.04, 220/560.07; 62/53.2; 210/180
See application file for complete search history.

(56) References Cited

U.S. PATENT DOCUMENTS 3,933,448 A * 1/1976 Di Peri ............................ 96/219
4,489,745 A * 12/1984 Netter et al. ................... 137/209

(Continued)

FOREIGN PATENT DOCUMENTS

DE  3 146 262  5/1983
EP  0 522 954  1/1993

OTHER PUBLICATIONS

International Search Report for PCT/FR2010/050130, mailed Apr. 21, 2010.

(Continued)

*Primary Examiner* — Andrew Perreault
*Assistant Examiner* — James M Van Buskirk
(74) *Attorney, Agent, or Firm* — Christopher J. Cronin

(57) ABSTRACT

A cryogenic tank for a space launcher, comprising a partition and delimiting top and bottom volumes communicating via at least one free central opening formed in the partition, so as, on the one hand, to allow for the flow of liquid by gravity from the top volume to the bottom volume via the central opening or openings and, on the other hand, to prevent the rising of the fluid from the bottom volume to the top volume via the central opening or openings under the action of acceleration forces, the tank also comprising at least one vent forming separate from the central opening or openings and providing fluid communication between the top and bottom volumes, the vent being configured to favor the migration of vapor from the bottom volume to the top volume and to prevent the rising of liquid from the bottom volume to the top volume.

9 Claims, 2 Drawing Sheets

(56) References Cited

U.S. PATENT DOCUMENTS

| | | | |
|---|---|---|---|
| 5,013,435 A | * | 5/1991 | Rider et al. ............... 210/262 |
| 5,240,038 A | * | 8/1993 | Canedi ..................... 137/574 |
| 5,279,323 A | | 1/1994 | Grove et al. |
| 5,901,557 A | | 5/1999 | Grayson |
| 2010/0243553 A1 | * | 9/2010 | Vuilliomenet ............ 210/435 |

OTHER PUBLICATIONS

French Search Report for FR 0950697, mailed Sep. 11, 2009.

\* cited by examiner

CRYOGENIC TANK AND SPACE LAUNCHER INCLUDING SUCH A TANK

CROSS-REFERENCE TO RELATED APPLICATIONS

This application is a §371 of International PCT Application PCT/FR2010/050130, filed Jan. 28, 2010, which claims §119(a) foreign priority of French Patent Application 0950697, filed Feb. 5, 2009.

BACKGROUND

1. Field of the Invention

The present invention relates to a cryogenic tank for a space launcher and a space launcher comprising such a tank.

2. Related Art

In the ballistic phase, or during the transitional satellite station acquisition phases, the propellants may wet all the walls of their tank. This leads to an extremely significant evaporation of the cryogenic liquid in the tank and a strong cooling of the gaseous dome situated above the liquid part of the tank. Solutions to this problem are known for non-cryogenic propellants (called storable propellants). These solutions are based on the capillary forces. The propellants are retained in the bottom part of the tank (close to the liquid outlet) by capillarity. For the cryogenic fluids, these solutions are difficult to apply because of thermo-capillary instabilities and possible evaporations close to the capillary systems resulting in drying of the systems and therefore a loss of efficiency.

Preferably according to the invention, to resolve this problem, an intermediate partition is provided in the storage volume so as, on the one hand, to allow for the flow of liquid by gravity from the top volume of the tank to the bottom volume of the tank via one of the central openings formed in the intermediate partition and, on the other hand, to prevent the rise of the liquid from the bottom volume to the top volume via the central opening or openings under the action of acceleration forces.

This type of solution is overall satisfactory. However, when filling the tank or in certain flight situations, the vaporization of the cryogenic liquid (notably against the internal face of the storage volume) may create vapor which is held captive under the abovementioned partition. This captive vapor under the partition may adversely affect the operating characteristics of the tank in the flight phase.

To resolve this problem, the addition of orifices to the partition would make it possible to evacuate the vapor bubbles, but this solution would result in liquid leaks toward the top of the tank in roll phases. These liquid leaks must be avoided to limit the wetting of the walls of the tank and excessive evaporations.

One aim of the present invention is to mitigate all or some of the drawbacks of the prior art mentioned above.

SUMMARY OF THE INVENTION

To this end, the tank according to the invention, also conforming to the generic definition given to it by the above preamble, is mainly characterized in that it comprises a jacket delimiting a storage volume for cryogenic liquid and at least one partition situated in the storage volume, said partition delimiting top and bottom volumes for the fluid in the tank, said top and bottom volumes communicating via at least one free central opening formed in the partition, the partition extending from the wall of the tank to the center of the storage volume with an incline toward the bottom end of the tank to the central opening or openings, so as, on the one hand, to allow for the flow of liquid by gravity from the top volume to the bottom volume via the central opening or openings and, on the other hand, to prevent or limit the rising of the fluid from the bottom volume to the top volume via the central opening or openings under the action of acceleration forces, the tank also comprising at least one vent forming at least one passage in the partition separate from the central opening or openings and providing fluid communication between the top and bottom volumes, the passage of the vent being configured on the one hand to favor the migration of vapor from the bottom volume to the top volume and, on the other hand, to prevent or limit the rise of liquid from the bottom volume to the top volume.

The vent is thus structurally configured to evacuate the vapor bubbles toward the top of the tank (above the partition) while making it possible to contain the liquid below the partition during roll phases or during so-called disturbed phases (high or low gravity).

Moreover, embodiments of the invention may include one or more of the following characteristics:
- the vent defines on the passage a retaining barrier or mechanical abutment for the liquid in the direction of its rise from the bottom volume to the top volume,
- the vent or vents are situated on the partition, between the jacket of the tank and the central opening or openings,
- the vent or vents are situated so as to be adjacent to the jacket of the tank,
- the vent has at least one wall forming a chicane for the liquid in the direction of rise from the bottom volume to the top volume,
- the vent has at least one wall forming an abutment for the liquid in the vertical direction from the bottom volume to the top volume,
- the passage of the vent opens into the top volume in a direction perpendicular to the vertical direction of the tank,
- the vent comprises a housing whose internal volume communicates fluidically on the one hand with the bottom volume via one or more first orifices formed in the partition and, on the other hand, with the top volume via one or more second orifices formed in the housing,
- the housing protrudes into the top volume,
- the internal volume of the housing communicates fluidically with the bottom volume via at least two orifices formed in the partition and situated at different distances from the jacket,
- the partition extends over most of the internal section of the tank in a direction substantially perpendicular to a vertical axis A of the tank passing through the top and bottom ends of the tank, the ratio between, on the one hand, the surface area of the opening or openings of the partition and, on the other hand, the internal section of the tank in a plane substantially perpendicular to the vertical axis of the tank passing through the plane of the opening being between 0.0025 and 0.8 and preferably between 0.0025 and 0.5 and even more preferably between 0.01 and 0.1,
- at least a part of the partition is slightly inclined toward the bottom end of the tank,
- the partition has a tubular portion oriented toward the bottom end of the tank and defining the opening,
- the partition is flexible,
- the opening or openings is (are) situated in the central part of the tank, the openings ensure the same pressure in the top and bottom volumes.

The invention also relates to a space launcher comprising a cryogenic tank conforming to any one of the above or below characteristics.

The invention may also relate to any alternative device or method comprising any combination of the above or below characteristics.

BRIEF DESCRIPTION OF THE FIGURES

Other particular features and advantages will become apparent from reading the following description, given with reference to the figures in which.

DETAIL DESCRIPTION OF THE INVENTION

Figure 4:
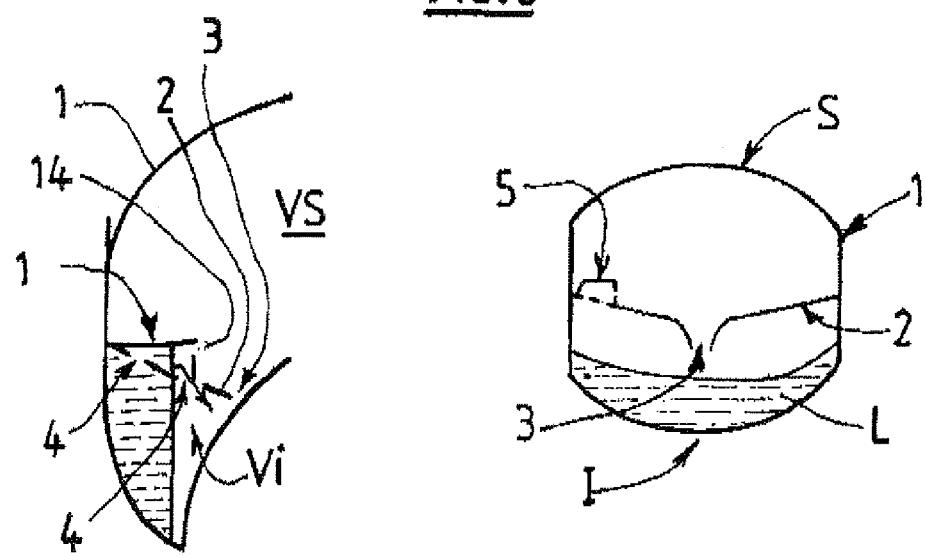
FIG. 4 represents a schematic view, partial and in cross section, of a detail of a vent of a tank according to the invention.
Figure 5:
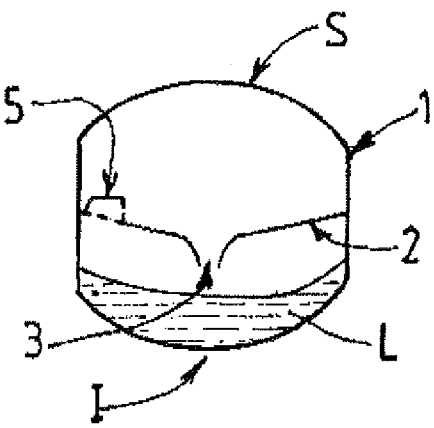
FIG. 5 represents a schematic and cross-sectional view of another exemplary embodiment of a tank according to the invention.

The invention will be described with FIGS. 1 to 4 in an application to a so-called "concave bottom" tank (the convexity being inside the tank 1). Obviously, the invention can be applied to any other tank shape and notably to tanks with convex bottom (FIG. 5).

The tank represented in FIGS. 1 to 4 comprises a peripheral wall or jacket 1 delimiting a storage volume for the cryogenic fluid (for example, a substantially cylindrical central portion and two dome-shaped ends).

For simplicity, the outlet orifice for the fluid situated in the bottom part I of the tank is not represented. Conventionally, such a tank consists of an insulated aluminum alloy structure with cellular foam panels. According to a particular feature of the invention, the tank contains a partition 2 situated in the storage volume and arranged to retain the liquid during significant lateral and/or axial accelerations. The partition 2 is, for example, fixed to the internal face of the jacket 1.

The partition 2 delimits in the tank top VS and bottom VI volumes for the liquid communicating via openings 3 formed in the partition 2.

In the exemplary tank of FIGS. 1 to 4, the central part of the bottom may be located above a part of the partition 2. In other words, the partition 2 surrounds the dished bottom of the tank. In this configuration, the bottom volume VI has a generally toric shape. The partition 2 is curved toward the bottom in the direction of the central part of the storage volume. The opening or openings 3 are situated close to the bottommost point of the partition 2, around the dished bottom which protrudes into the storage volume.

The structure of the partition 2 makes it possible to retain all or some of the liquid in the bottom part in case of low thrust and low roll but allows the liquid to flow from the top volume VS to the bottom volume VI via the openings 3.

Thus, when the liquid level L is below the partition 2 (FIG. 1), the partition 2 makes it possible to avoid the rise of liquid to the top volume VS. The partition 2 even makes it possible to store the liquid in case of adverse acceleration when said acceleration is applied following a phase with roll.

Thus, by virtue of the partition 2, during these stress phases, the liquid wets a fairly limited parietal surface and does not come into contact with the relatively hotter top gaseous dome. The evaporation of liquid is thus limited. The cooling of the gaseous dome in the tank is also limited.

The openings 3 are free, that is to say not provided with gratings, filters or equivalent, which means that the top VS and bottom VI volumes form one and the same storage volume with identical pressures (unlike the tanks with surface tension). The tanks with surface tension use strainers, unlike the tank according to the invention. Obviously, the openings may have shapes other than those represented in the figures.

The partition 2 may be made of a very light material (glass fabric or any other appropriate material, for example polyaramide, polyester, polyimide, etc.), in particular when the tank stores liquid hydrogen (relatively light).

According to an advantageous particular feature, the tank also comprises at least one vent 5 and for example four vents. Each vent 5 forms at least one passage 4, 14 in the partition 2 separate from the central opening or openings 3 to provide fluid communication between the top VS and bottom VI volumes of the tank. The passage 4, 14 of the vent 5 is configured so as, on the one hand, to allow for the migration of vapor from the bottom volume VI to the top volume VS and, on the other hand, to prevent or limit the rise of liquid from the bottom volume VI to the top volume VS during acceleration phases.

For example, each vent 5 defines on the passage 4, 14 a retaining barrier 15 or mechanical abutment for the liquid in the direction of its rise from the bottom volume VI to the top volume. On the other hand, the barrier 15 or mechanical abutment guides the vapors toward an orifice 14 opening into the top volume VS. Preferably, the vents 5 are situated on the partition 2, between the jacket 1 of the tank and the central opening or openings 3. As can be seen in the figures, the vents 5 are more preferably situated so as to be adjacent to the peripheral jacket 1 of the tank.

In an exemplary but by no means limiting embodiment represented, each vent 5 may have at least one wall 15 delimiting a chicane for the liquid in the direction of rise from the bottom volume VI to the top volume VS. The vent 5 may notably have at least one wall 15 forming an abutment for the liquid in the vertical direction from the bottom volume VI to the top volume VS. The vent 5 may comprise, for example, a housing added to the partition 2 and whose internal volume communicates fluidically on the one hand with the bottom volume VI and on the other hand with the top volume VS.

For example, the internal volume of the housing communicates fluidically with the bottom volume VI via at least two orifices 4 formed in the partition 2. Preferably, the two orifices 4 providing communication between the housing 5 and the bottom volume VI are situated at different distances from the jacket 1 and therefore at different heights on the inclined partition 2.

The housing 5 may communicate with the top volume VS for example via an orifice 14 which opens in a direction substantially perpendicular to the vertical direction of the tank.

Figure 1:
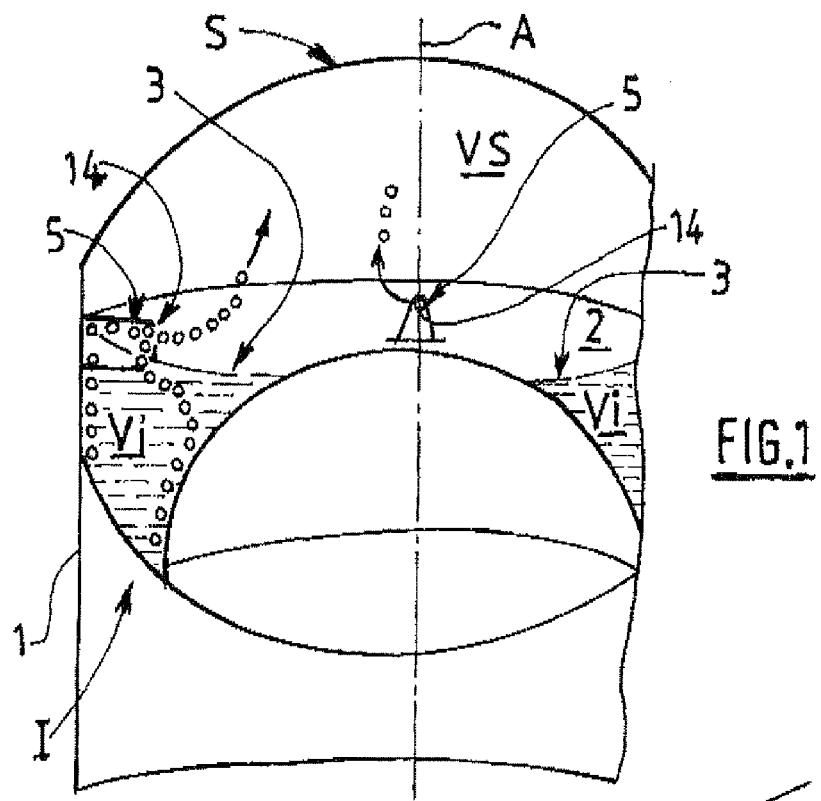
FIG. 1 represents a schematic view, partial and in cross section, of an exemplary embodiment of a tank according to the invention in the partial filling phase.
Figure 2:
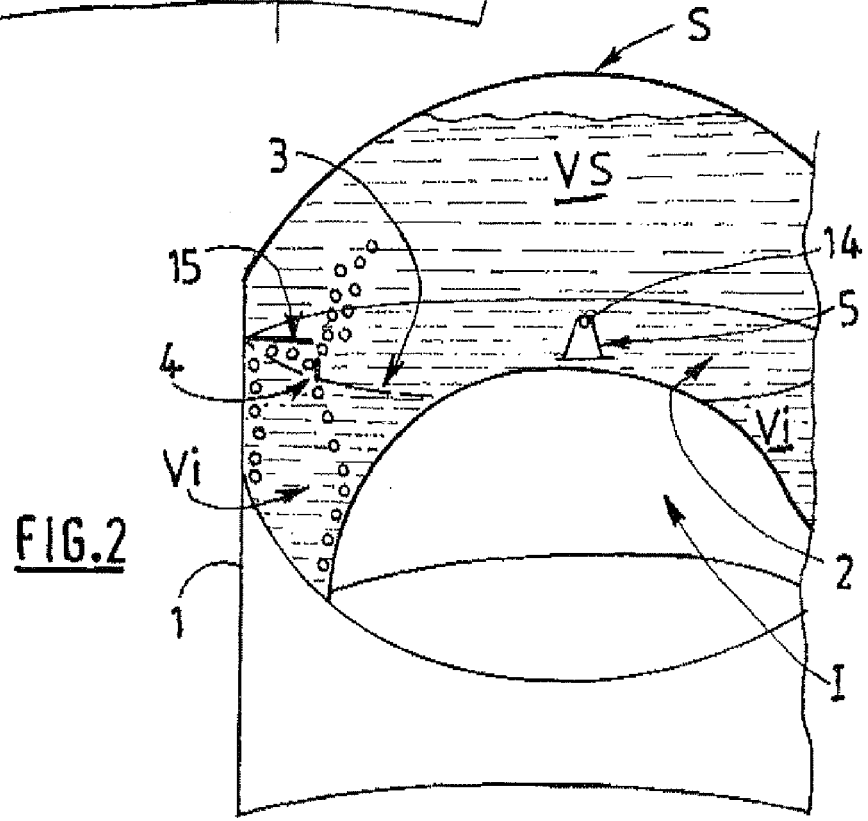
FIG. 2 represents the tank of FIG. 1 after filling.
Figure 3:
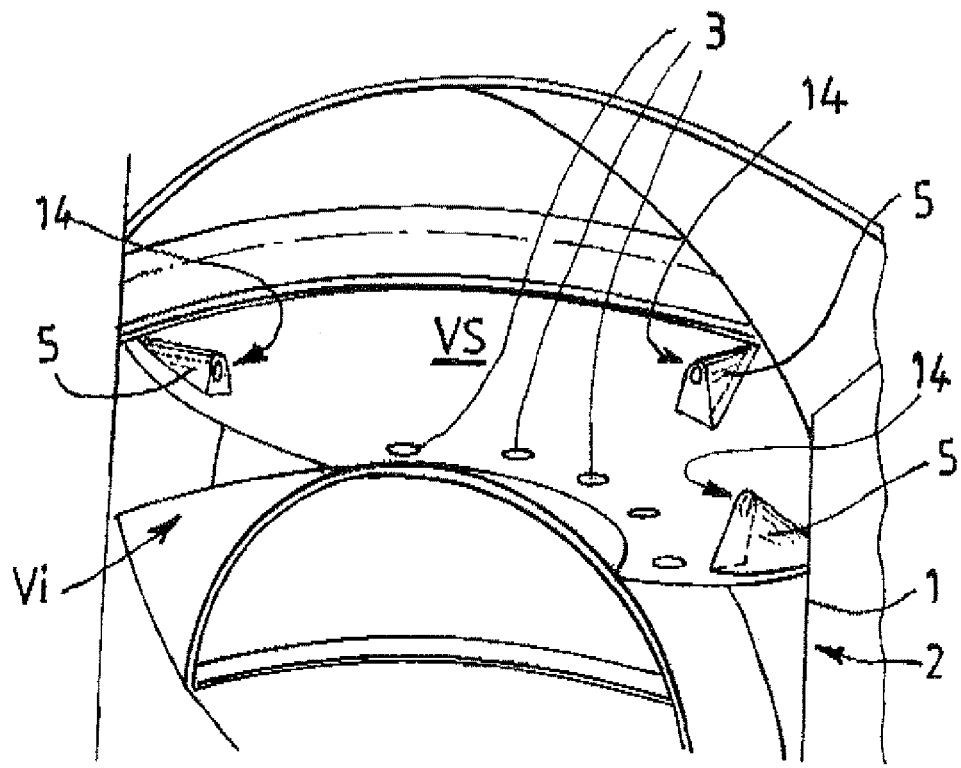
FIG. 3 represents a schematic view, partial and in perspective, of a half vertical cross section of the tank of FIGS. 1 and 2.

In this way, during filling, the vaporized liquid bubbles take the orifices 4, 14 to reach the top part of the tank (see FIG. 1, the liquid level is represented by shading lines). The bubbles may also take the openings 3.

At the end of filling (FIG. 2), the vent 5 is submerged with liquid but may continue to allow the migration of bubbles toward the top end.

In the flight phase, when there is only a fraction of liquid remaining in the bottom volume VI, the vent 5 forms a retainer for the liquid preventing the latter from rising into the top volume VS. FIG. 4 schematically illustrates a possible configuration of the liquid during a strong roll associated with a low acceleration. The liquid may notably enter into the housing of the vent 5 via the orifice 4 adjacent to the peripheral jacket 1 and exit into the bottom volume VI via the orifice 4 a little further away from the peripheral jacket 1. The vapor may escape more easily toward the top volume VS via the orifice 14 which opens into this top volume VI.

Obviously, the invention is not limited to the above examples. In particular, the structure and the number of vents may be modified according to the applications.

Similarly, tanks with convex bottom may also be provided with one or more vents 5. FIG. 5 illustrates a tank in which the partition 2 is inclined toward the bottom to a central opening 3 (optionally funnel-shaped).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A cryogenic tank for a space launcher intended to contain a propellant wherein the cryogenic tank comprises a jacket delimiting a storage volume for cryogenic liquid and at least one partition situated in the storage volume, said partition delimiting top and bottom volumes for the fluid in the tank, said top and bottom volumes communicating via at least one central opening formed in the partition, the partition extending from a wall of the tank to a center of the storage volume with an incline toward a bottom end of the tank to the at least one central opening, so as to allow for a flow of liquid by gravity from the top volume to the bottom volume via the at least one central opening and to prevent or limit the rising of the fluid from the bottom volume to the top volume via the at least one central opening under the action of acceleration forces, the tank further comprising at least one vent forming at least one passage in the partition separate from the at least one central opening and providing fluid communication between the top and bottom volumes, characterized in that the at least one central opening is free and in that the passage of the vent is configured to favor migration of vapor from the bottom volume to the top volume and to prevent or limit the rising of liquid from the bottom volume to the top volume.

2. The tank of claim 1, wherein each of the at least one vent defines on the passage a retaining barrier or mechanical abutment for the liquid in the direction of its rise from the bottom volume to the top volume.

3. The tank of claim 1, wherein each of the at least one vent is situated on the partition, between the jacket of the tank and the central opening or openings.

4. The tank of claim 1, wherein each of the at least one vent is situated so as to be adjacent to the jacket of the tank.

5. The tank of claim 1, wherein each of the at least one vent has at least one wall forming a chicane for the liquid in the direction of rise from the bottom volume to the top volume.

6. The tank of claim 1, wherein each of the at least one vent has at least one wall forming an abutment for liquid in the vertical direction from the bottom volume to the top volume.

7. The tank of claim 1, wherein the passage of each of the at least one vent opens into the top volume in a direction perpendicular to the vertical direction of the tank.

8. The tank of claim 1, wherein each of the at least one vent comprises a housing whose internal volume communicates fluidically with the bottom volume via one or more first orifices formed in the partition and communicates fluidly with the top volume via one or more second orifices formed in the housing.

9. The tank of claim 8, wherein the housing protrudes into the top volume.

\* \* \* \* \*